A. P. LEE.
DUMPING VEHICLE.
APPLICATION FILED APR. 3, 1916.
1,253,058.
Patented Jan. 8, 1918.
8 SHEETS—SHEET 2.
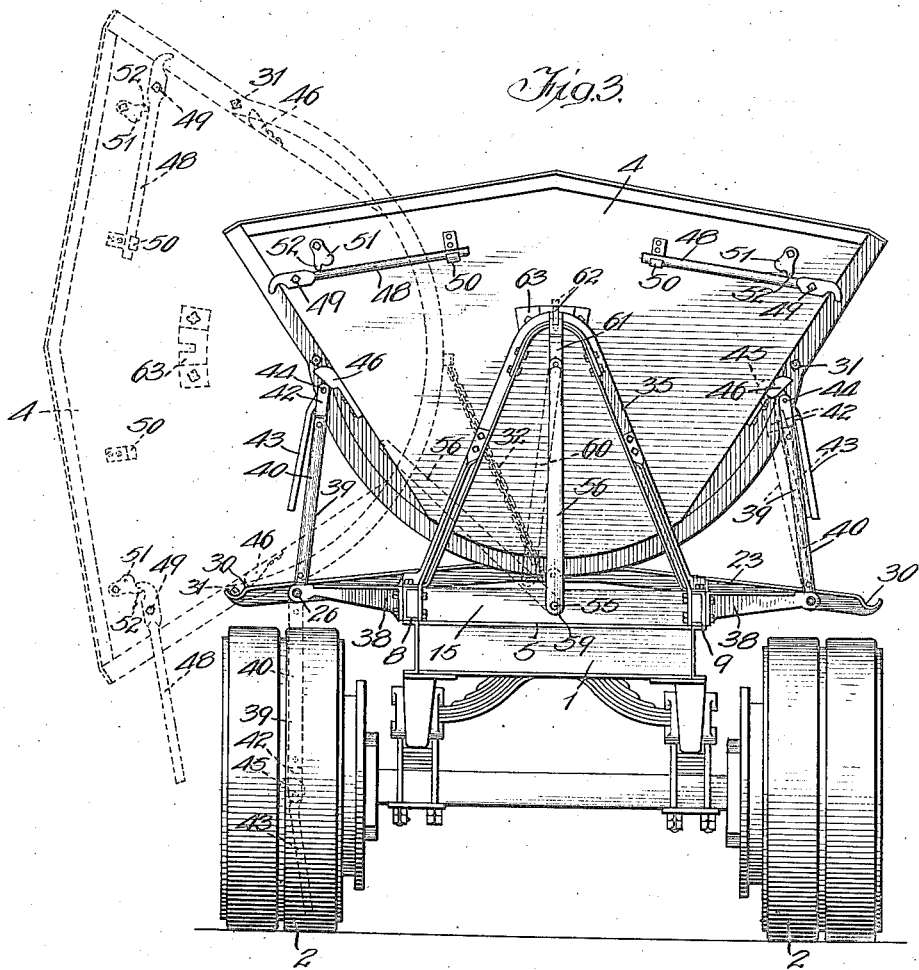
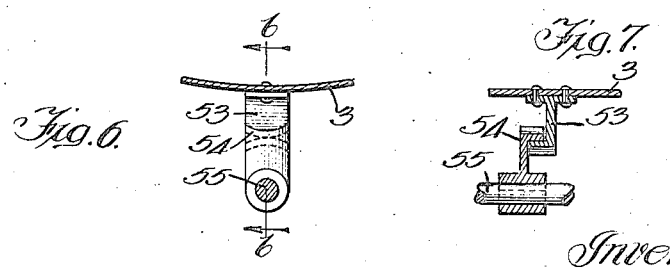

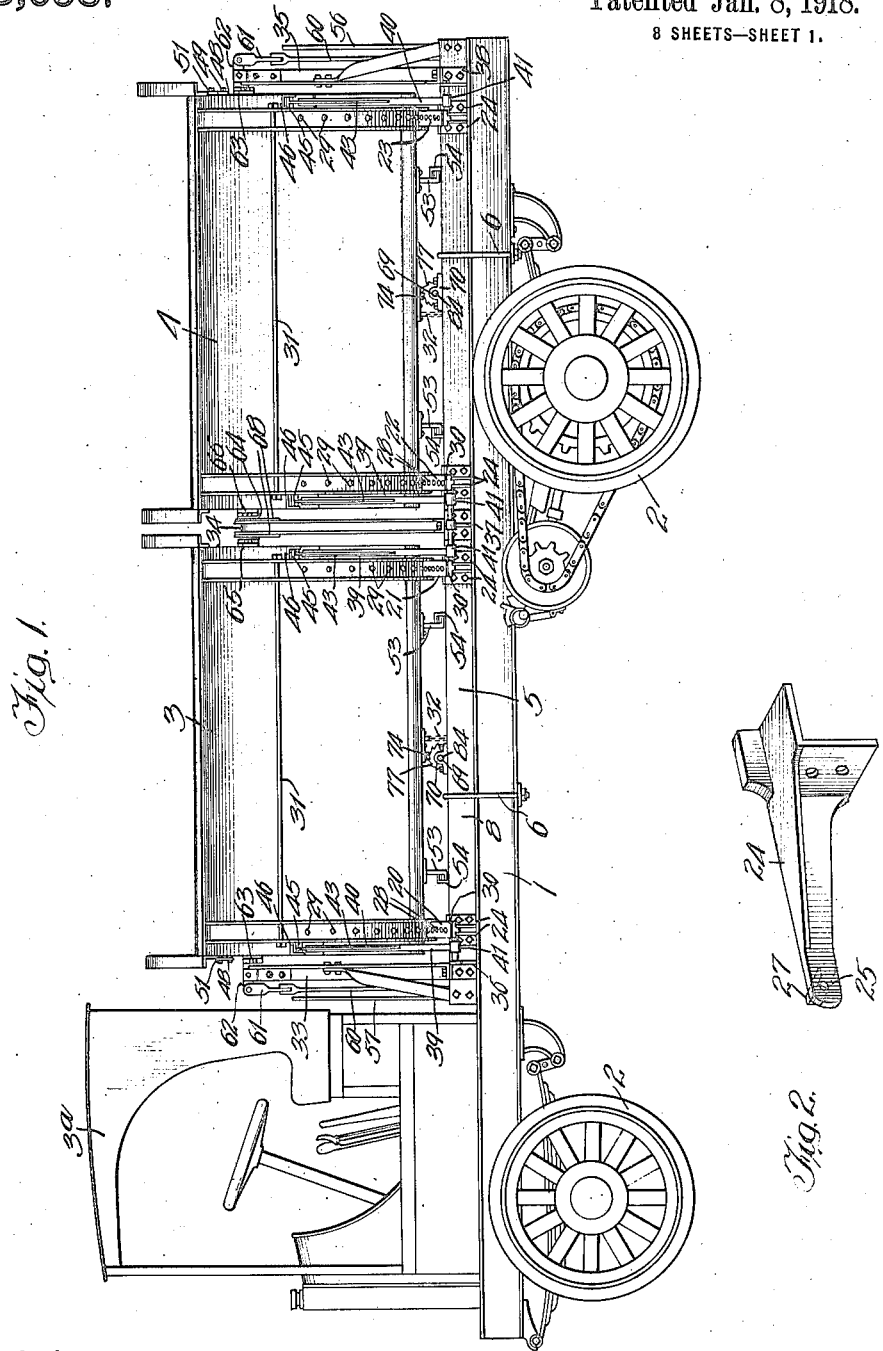

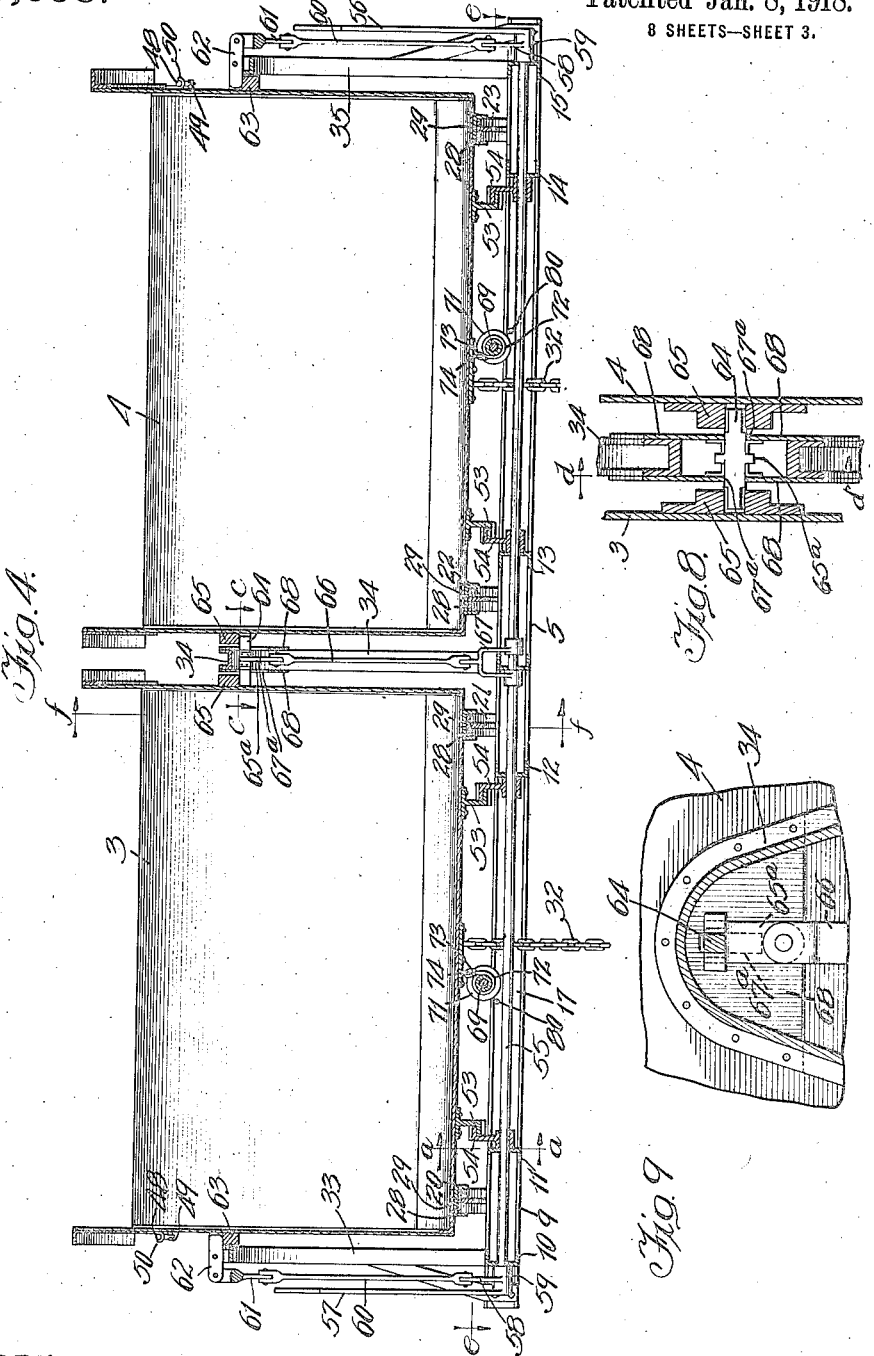

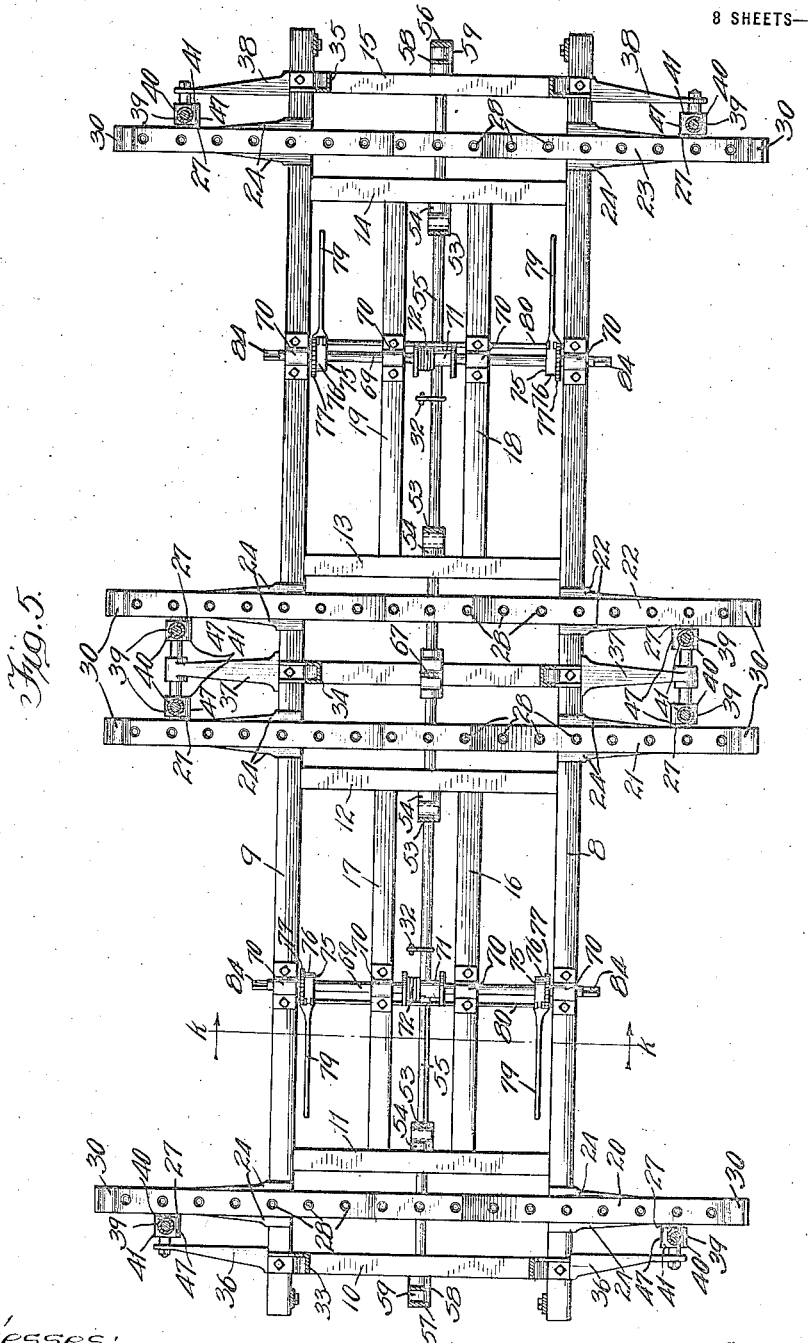

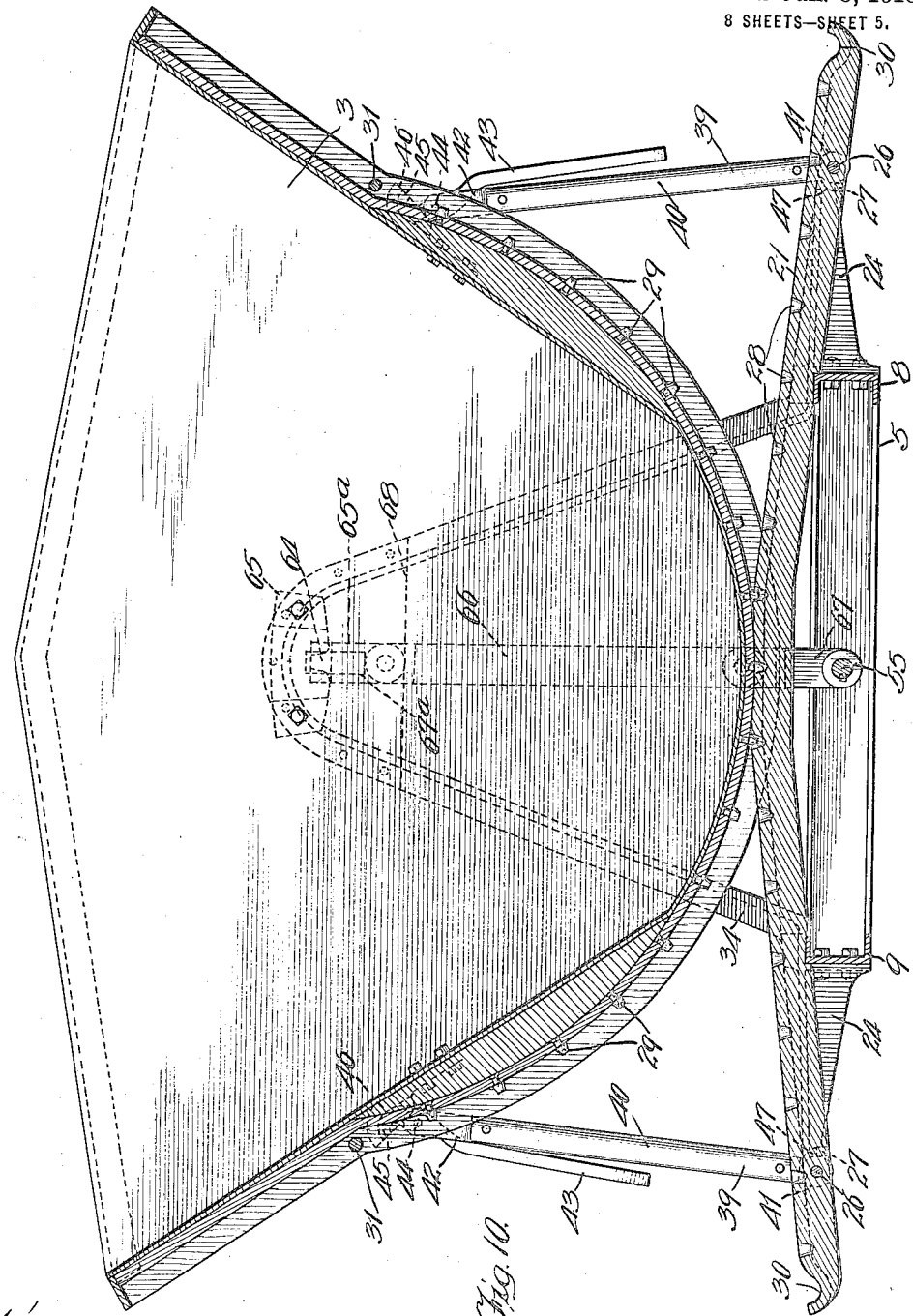

A. P. LEE.
DUMPING VEHICLE.
APPLICATION FILED APR. 3, 1916.
1,253,058.
Patented Jan. 8, 1918.
8 SHEETS—SHEET 6.
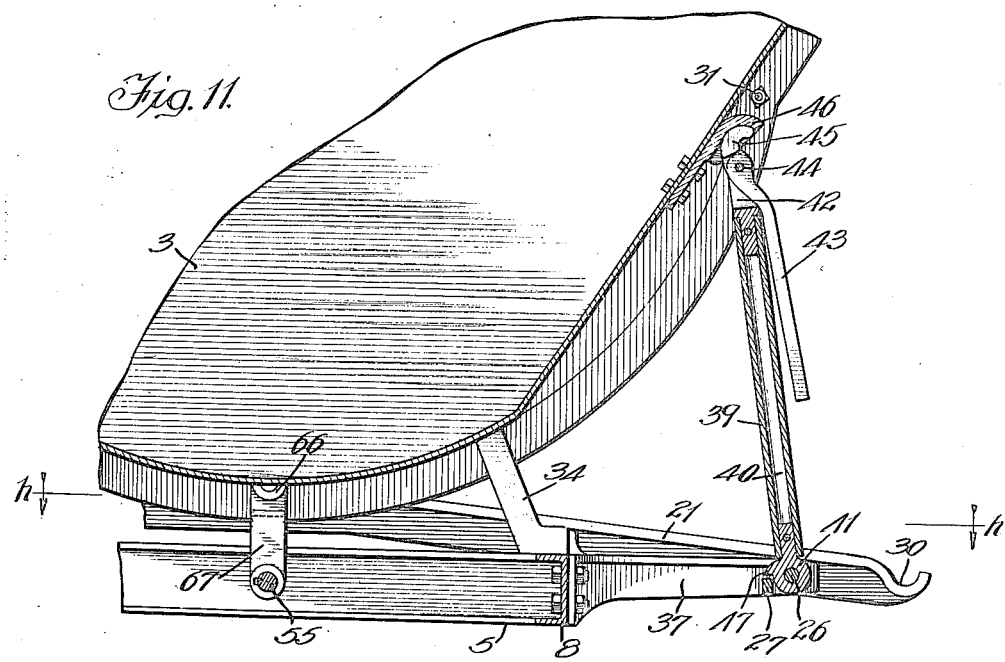
Fig. 11.
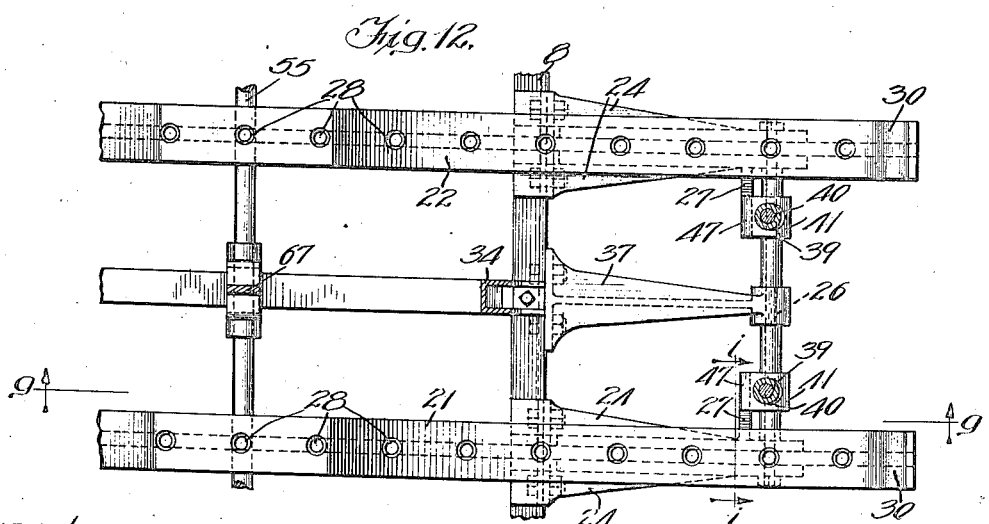
Fig. 12.
Witnesses:
W. P. Kilroy
Harry R. L. White
Fig. 13
Inventor:
Albert P. Lee
By May W. Zabel
Atty.

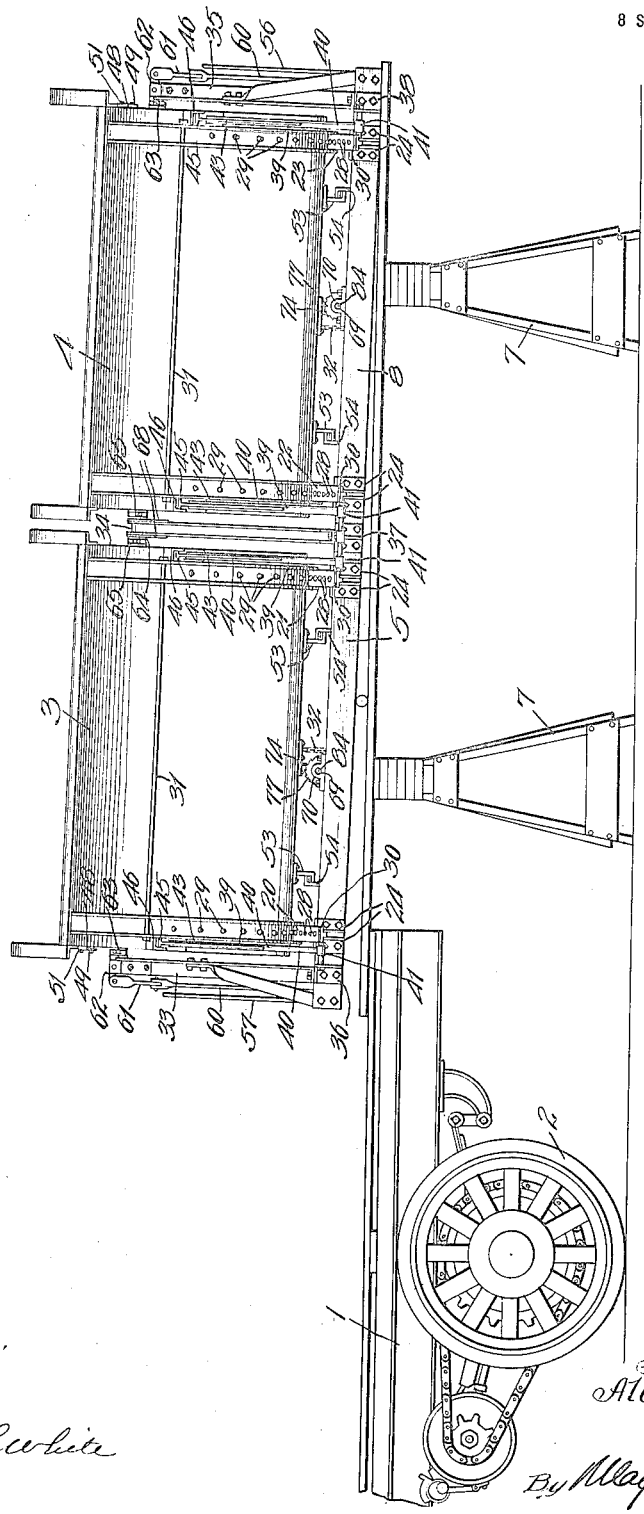

UNITED STATES PATENT OFFICE.

ALBERT P. LEE, OF CHICAGO, ILLINOIS, ASSIGNOR TO LEE LOADER & BODY CO., OF CHICAGO, ILLINOIS.

DUMPING-VEHICLE.

1,253,058.  Specification of Letters Patent.  Patented Jan. 8, 1918.

Application filed April 3, 1916. Serial No. 88,523.

*To all whom it may concern:*

Be it known that I, ALBERT P. LEE, a citizen of the United States, residing at Chicago, in the county of Cook and State of Illinois, have invented a certain new and useful Improvement in Dumping-Vehicles, of which the following is a full, clear, concise, and exact description, reference being had to the accompanying drawings, forming a part of this specification.

My invention relates to dumping vehicles, and has for its object the provision of an improved form of construction of dumping hoppers used in connection with such vehicles. My invention furthermore contemplates the provision of improved means for holding the hoppers in their central positions, together with improved locking and unlocking facilities whereby the said hoppers may be held or released as desired.

My invention further provides improved means for causing the discharge operation, and also means whereby the dumping function may be retarded or carried on as slowly as conditions require, said means making it possible also to lock the hopper in any position between the normal and the discharge position.

I further improve the framework construction in such a way that a movable framework provided with and carrying a hopper or hoppers having the means aforesaid may be placed upon a flat bottomed vehicle, or removed therefrom so that the vehicle can be transformed from an ordinary truck to a dumping truck, thus increasing the flexibility of this style of apparatus.

I will explain my improved dumping vehicle in detail in connection with the accompanying drawings, in which:

Figure 1 is a side view of a dumping vehicle constructed in accordance with my invention;

Fig. 2 is a detail of construction showing the devices for supporting the rails on which the hoppers roll;

Fig. 3 is an end view of a vehicle;

Fig. 4 is a longitudinal sectional view of the structure;

Fig. 5 is a top view of the framework with the hoppers removed substantially along line *e—e* of Fig. 4;

Fig. 6 is a sectional view along line *a—a* of Fig. 4;

Fig. 7 is a sectional view along line *b—b* of Fig. 6;

Fig. 8 is a sectional view along line *c—c* of Fig. 4;

Fig. 9 is a sectional view on line *d—d* of Fig. 8;

Fig. 10 is a sectional view along line *f—f* of Fig. 4;

Fig. 11 is a sectional view along line *g—g* of Fig. 12;

Fig. 12 is a sectional view along line *h—h* of Fig. 11;

Fig. 13 is a sectional view along line *i—i* of Fig. 12;

Fig. 18 is a view in general similar to that of Fig. 1 showing the hopper carrying framework removed from the vehicle to leave a flat bottomed vehicle.

Figure 14:
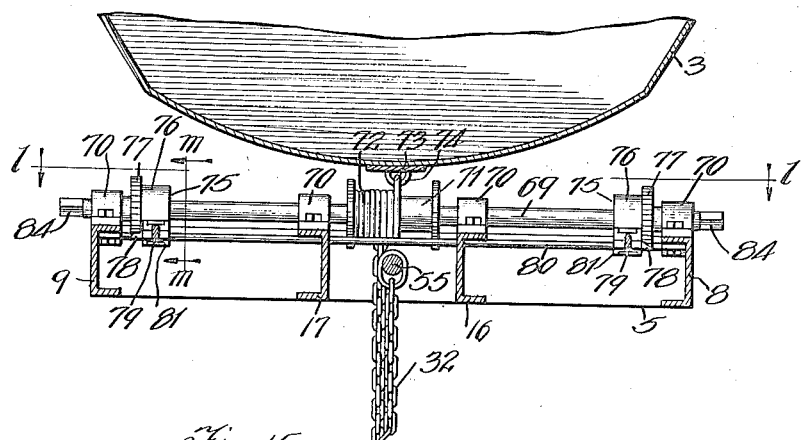
Fig. 14 is a sectional view along line *k—k* of Figs. 5 and 15.

My improved truck or vehicle is shown in general outline in Fig. 1 where it is shown as provided with a flat bottom 1 constituting the vehicle proper, having suitable wheels 2, 2 and driving cab 3ª. The structure including the buckets or hoppers 3, 4, which structure also includes the framework 5, is held to this vehicle body preferably by the links 6, 6. This hopper structure including the framework 5 is removable as more clearly apparent from Fig. 18 when this entire structure is shown as taken from the vehicle body 1 and placed upon the horses 7, 7, thus leaving the vehicle itself as a flat bottom vehicle for ordinary carrying purposes as may be desired.

The removable structure comprises two channels 8 and 9, referring more particularly to Fig. 5, running longitudinally, which channels are held together by crosschannels 10, 11, 12, 13, 14 and 15. Further bracing channels 16, 17, 18 and 19 are provided running respectively between the channels 11 and 12, and the channels 13 and 14. Four rails 20, 21, 22 and 23 are mounted upon this channel framework, each rail being held in place by two brackets 24, 24, one of the brackets being more clearly shown in perspective in Fig. 2. These brackets have holes 25 at their extremities to support studs 26 for fastening these brackets at their extremities to the rails. The studs 26 further carry rotatable hubs as will presently appear. These brackets also have extending fingers 27 whose purpose will presently appear. The rails as shown more clearly in Figs. 3, 4, 10 and 11 are preferably of T-iron form and slope downwardly from their central portions. The rails are also provided with holes 28 as seen more clearly in Fig. 10, which holes are adapted to register with the rivets 29 to prevent displacement of the hoppers 3 and 4 from said rails. The rails at their extremities have curved fingers 30, 30 to coöperate with pins 31 provided upon the hoppers to secure a more complete tilting movement when the hoppers have reached the limit of their dumping position, as more clearly apparent from Fig. 3. Chains 32 prevent the hoppers from leaving the rail entirely. The stationary part of the framework further includes angles 33 and 35 and the channel 34. Additional brackets 36, 36, 37, 37, and 38, 38 extend from the framework to support the studs 26 in conjunction with the brackets 24.

In order to support and hold the hoppers in their central position, I provide links 39, preferably tubular in form and (referring more particularly to Fig. 11) consisting preferably of tube sections 40 with cast end lugs 41, 42, the lugs being securely pinned to the tube section 40. The lug 41 is then pivoted upon the stud 26. The lugs 42 carry handles 43 which are pivoted to the said lugs upon the studs 44 and these handles have at their opposite extremities cams 45. These cams are adapted to coöperate with scoops or hoods 46 mounted upon the hopper exteriors.

It will be seen by referring more particularly to Fig. 11 that when the link structure consisting of the link elements 39 and 43 is in the position shown, that any tendency of the hopper to roll (for instance) toward the right would be prevented by this link structure which locks itself into position in the order of a toggle joint. Now whenever it is desired to permit the hopper to tilt, then the handle 43 (Fig. 11) is moved contra-clockwise, thereby withdrawing the cam 45 from the hood 46, whereupon the links 39 with the handle are swung in a clockwise direction out of the path of the oncoming hopper. In order to prevent the link 39 from moving inwardly any farther than the position shown in Fig. 11, I provide upon the lug 41 a nose 47 which is adapted to engage the fingers 27 projecting from the brackets 24, as shown more clearly in Figs. 11 and 12. When the links 39 are swung 180° clockwise out of the position they are shown as occupying in Fig. 11, then of course the nose 47 is below the rails so as not to obstruct the movement of the hopper. The arrangement of the nose and its coöperating parts is further illustrated in Fig. 13.

In order to securely hold the hoppers so that no twisting action takes place, I utilize four sets of links for each hopper, that is, two upon each side of the hopper preferably at the extremities as illustrated. In order to give the hopper a start toward tilting I provide handles or levers 48, referring more particularly to Fig. 3, which in full lines are shown in their normal positions. These levers are pivoted at 49, the handle portion being held in suitable hooks 50. Locking dogs 51 hold these levers in the position shown in full lines in Fig. 3.

Now should it be desired to make use of the lever to tilt the hopper, for instance, toward the dotted position of Fig. 3, then the locking dog 51 is moved out of the position shown in full lines so that the lever 48 can be released from the hook 50, whereupon the lever is brought back to catch underneath the projections 52 of this locking dog as shown more clearly in dotted lines in Fig. 3; whereupon the lever is in condition for use to start the tilting movement. When not in use then the lever is placed back into the position shown in full lines in Fig. 3.

In order further to assist in locking the buckets in their central position and furthermore to hold them tightly against the rails so as to avoid having the hoppers leave the rails when the car is traveling over a rough road, I provide catches or fingers 53 which project downwardly from the base of the hoppers. These fingers 53 coöperate with corresponding fingers 54 carried by a shaft 55. The construction of these fingers will be more clearly apparent from Fig. 6 and Fig. 7. The circular extensions of these fingers, due to their being rounded in opposite directions, serve as clamps to draw the hopper down tightly onto the rails when these fingers are moved into position by the rotation of the shaft 55. This shaft 55 is held and journaled in the channels 10, 11, 12, 13, 14 and 15, and is rotated by means of handles 56 or 57 (Fig. 4) mounted upon opposite extremities of said shaft so that the unlocking operation may be carried on from either extremity of the vehicle. In order further to lock the hoppers in their central position I provide links 58 also fastened to the hubs 59 carrying the handles 56 and 57, which links carry additional links 60. These additional links in turn carry the links 61 at their upper extremities, which links are adapted to operate the lever locks 62, 62. These lever locks 62 enter recesses provided in locks 63 mounted upon the extremities of the hoppers. The lever locks 62 furthermore are pivotally held in the angles 33 and 35 respectively which are found at opposite ends of the structure. Thus whenever the shaft 55 is rotated in either direction from the position shown in Fig. 4, the fingers 53 and 54 are placed out of alinement and at the same time locking levers 62 are withdrawn from the lock 63 to thus permit the hoppers freedom of rolling movement so far as these locking devices are concerned.

I have however provided a further locking device operated at the same time and which locks the central portions of the hoppers. This locking device consisting of the bolt 64 is moved into and out of recesses provided in the lugs 65, 65, in accordance with the movements of the shaft 55. In order to cause the proper movement of this bolt 64, I mount the same upon a link 65ᵃ carried by a coöperating link 66 which in turn is carried by the arm 67 projecting from the shaft 55. Thus whenever the shaft is moved the bolt 64 is pulled downwardly away from the lug 65. The bolt 64 is guided within a groove 67ᵃ provided in plates 68, 68 mounted against the open face of the channel 34. It will thus be seen that the movement of the shaft locks the two hoppers at eight points, thus preventing rolling of the hopper from its central position, and also preventing the hoppers from leaving the rails.

Figure 15:
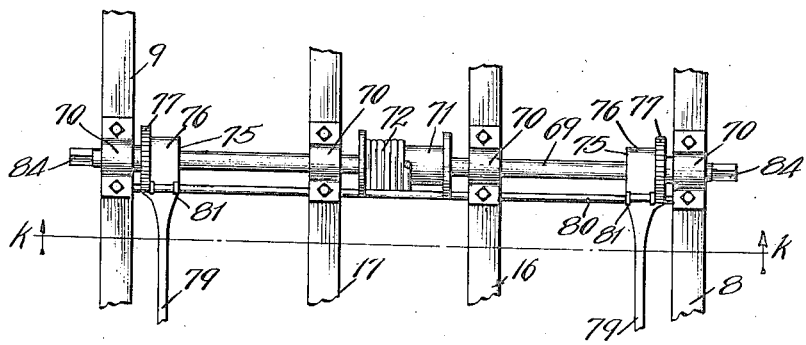
Fig. 15 is a sectional view along line *l—l* of Fig. 14.
Figure 17:
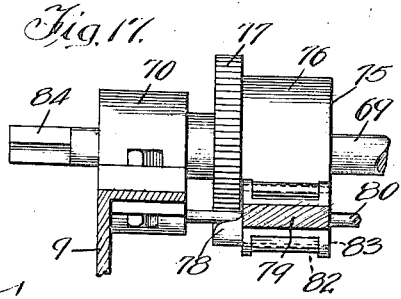
Fig. 17 is a sectional view on line *n—n* of Fig. 16.
Figure 16:
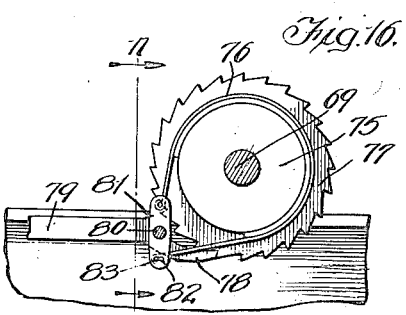
Fig. 16 is a sectional view along line *m—m* of Fig. 14.

In order to control the degree of tilting of either one of the hoppers, and also to lock either one of the hoppers in any desired position away from the central position, I provide the structure illustrated more in detail in Figs. 4, 14, 15, 16 and 17. This structure includes a shaft 69, which shaft is pivotally held within bearings 70 provided upon the channels 9, 17, 16 and 8, which shaft carries a drum 71 having a rope or cable 72 provided with a hook 73 which is hooked into the eye 74 whenever it is desired to make use of this particular portion of the apparatus. Normally the hook 73 is released from the eye 74. This shaft also carries a brake drum 75, which brake drum is provided with a brake strap 76. The shaft also carries a ratchet wheel 77, which ratchet wheel coöperates with a dog 78. The dog 78 is fixedly secured to a handle 79, which handle is pivotally mounted upon the shaft 80. The handle 79 also carries through the agency of the bracket 81 the protruding extensions of the brake strap 76. A slight lost motion is provided between the pin 82 and the eyelet extremity 83 of the brake strap 76 so that the handle 79 (Fig. 16) can be moved a slight distance in a clockwise direction sufficiently to release the dog 78 from the teeth of the wheel 77 without applying the brake. In this condition the hopper can roll freely and if it is desired to apply the brake the handle 79 is moved farther in a clockwise direction. Then should it be desired to hold the hopper in any given position, the handle 79 is readily moved in a contra-clockwise direction to the position shown in Fig. 16, thereby locking the hopper in any desired given position.

From this it will be apparent that the hopper can be permitted to discharge its contents slowly and can be held in any desired position. Furthermore the shaft 69 can be rotated by having any suitable handle attached to the squared end 84 thereof as readily apparent should it be desired to bring the hopper back to central position without the hopper being entirely empty.

From what has been described the nature of my invention will be readily clear to those skilled in the art. Having however thus described one form which my invention may take, what I claim as new and desire to secure by Letters Patent is:

1. A device of the character described comprising a framework having a runway, a rolling hopper adapted to roll on said runway in either direction from its central position, locking means to lock said hopper upon said runway, additional locking means to lock said hopper in its central position, and means operable in opposite directions from its central position for controlling both of said locking means aforesaid conjointly.

2. A device of the character described comprising a framework having a runway, a rolling hopper adapted to roll on said runway in either direction from its central position, locking means to lock said hopper upon said runway, said locking means including a pair of relatively movable fingers, additional locking means to lock said hopper in its central position, and means operable in opposite directions from its central position for controlling both of said locking means aforesaid conjointly.

3. A device of the character described comprising a framework having a runway, a rolling hopper adapted to roll on said runway in either direction from its central position, locking means to lock said hopper upon said runway, additional locking means to lock said hopper in its central position, said additional locking means including a bolt and a catch therefor mounted upon the end face of said hopper, and means operable in opposite directions from its central position for controlling both of said locking means aforesaid conjointly.

4. A device of the character described comprising a framework having a runway, a rolling hopper adapted to roll on said runway in either direction from its central position, locking means to lock said hopper upon said runway, said locking means including a pair of relatively movable fingers, additional locking means to lock said hopper in its central position, and a shaft operable in opposite directions from its central position for controlling both of said locking means aforesaid conjointly.

5. A device of the character described comprising a framework having a runway, a rolling hopper adapted to roll on said runway in either direction from its central position, locking means to lock said hopper upon said runway, additional locking means to lock said hopper in its central position, said additional locking means including a bolt and a catch therefor mounted upon the end face of said hopper, and a shaft operable in opposite directions from its central position for controlling both of said locking means aforesaid conjointly.

6. In a device of the character described the combination with a framework having a runway, a rolling hopper adapted to roll on said runway in either direction from its central position, a lever adapted to assist the initial tilting movement of said hopper, and a locking dog adapted to be engaged by said lever when tilting said hopper, and means whereby said dog locks said lever in its inoperative position.

7. In a device of the character described the combination with a framework having a runway, a rolling hopper adapted to roll on said runway in either direction from its central position, and toggle link mechanism carried by said framework sidewardly of said hopper to hold said hopper in its central position, said toggle link mechanism engaging said hopper on its opposite sides.

8. In a device of the character described the combination with a framework having a runway, a rolling hopper adapted to roll on said runway in either direction from its central position, and toggle link mechanism carried by said framework sidewardly of said hopper to hold said hopper in its central position, said toggle link mechanism engaging said hopper on its opposite sides, said link mechanism having a cam and said hopper having a lug provided with a cam surface to coöperate with said cam.

9. In a device of the character described the combination with a framework having a runway, a rolling hopper adapted to roll on said runway in either direction from its central position, and toggle link mechanism carried by said framework sidewardly of said hopper to hold said hopper in its central position, said toggle link mechanism engaging said hopper on its opposite sides, said link mechanism having a cam and said hopper having a lug provided with a cam surface to coöperate with said cam, said link mechanism including a handle.

10. In a device of the character described the combination with a framework having a runway, a rolling hopper adapted to roll on said runway in either direction from its central position, toggle link mechanism carried by said framework to hold said hopper in its central position, said toggle link mechanism engaging said hopper on its opposite sides, said link mechanism having a cam and said hopper having a lug provided with a cam surface to coöperate with said cam, said link mechanism including a handle, and means to limit the inward movement of said link mechanism.

11. In a device of the character described the combination with a framework having a runway, a rolling hopper adapted to roll on said runway in either direction from its central position, toggle link mechanism carried by said framework to hold said hopper in its central position, said link mechanism having a cam and said hopper having a lug provided with a cam surface to coöperate with said cam, said link mechanism including a handle, means to limit the inward movement of said link mechanism, and out riggers carried by said framework to support said link mechanism.

12. In a device of the character described the combination with a framework having a runway, a rolling hopper adapted to roll on said runway in either direction from its central position, toggle link mechanism carried by said framework to hold said hopper in its central position, said link mechanism having a cam and said hopper having a lug provided with a cam surface to coöperate with said cam, said link mechanism including a handle, and out riggers carried by said framework to support said link mechanism.

13. In a device of the character described the combination with a framework having a runway, a rolling hopper adapted to roll on said runway in either direction from its central position, means located at the bottom of the hopper to lock said hopper to said runway, means located at the ends of the hopper along the median line thereof to lock said hopper near its upper extremity in its central position, links arranged sidewardly of said hopper adapted to hold said hopper in its central position, and outriggers carried by said framework to carry said links.

In witness whereof, I hereunto subscribe my name this 30th day of March, A. D., 1916.

ALBERT P. LEE.

Witnesses:
HAZEL A. JONES,
MAX W. ZABEL.